(12) United States Patent
Raidan et al.

(10) Patent No.: US 10,447,971 B2
(45) Date of Patent: Oct. 15, 2019

(54) SYSTEM FOR CONTINUOUSLY MONITORING MOVEMENTS IN GENERAL

(71) Applicant: Prosegur Activa Argentina S.A., Ciudad Autonoma de Buenos Aires (AR)

(72) Inventors: Diego Raidan, Bogota (CO); Cristian Omar Novoa, Bogota (CO); Jorge Bestel, Bogota (CO)

(73) Assignee: Prosegur Activa Argentina, S.A., Buenos Aires (AR)

( * ) Notice: Subject to any disclaimer, the term of this patent is extended or adjusted under 35 U.S.C. 154(b) by 141 days.

(21) Appl. No.: 14/773,377

(22) PCT Filed: Jul. 17, 2013

(86) PCT No.: PCT/IB2013/055855
§ 371 (c)(1),
(2) Date: Sep. 7, 2015

(87) PCT Pub. No.: WO2014/135927
PCT Pub. Date: Sep. 12, 2014

(65) Prior Publication Data
US 2016/0021343 A1 Jan. 21, 2016

(30) Foreign Application Priority Data
Mar. 6, 2013 (AR) .............. P20130100739

(51) Int. Cl.
*H04N 7/00* (2011.01)
*H04N 7/18* (2006.01)

(52) U.S. Cl.
CPC .............. *H04N 7/181* (2013.01); *H04N 7/18* (2013.01)

(58) Field of Classification Search
CPC ................... H04N 7/181; H04N 7/18
(Continued)

(56) References Cited

U.S. PATENT DOCUMENTS

| 8,073,931 B2 | 12/2011 | Dawes |
| 2003/0163709 A1 | 8/2003 | Milgramm |

(Continued)

*Primary Examiner* — Zhihan Zhou
(74) *Attorney, Agent, or Firm* — The Morales Law Firm; Joseph L. Morales

(57) ABSTRACT

A system for continuous monitoring in general, preferably for use in surveillance, which includes three electronic units operationally linked to one another, wherein the first is a permanent monitoring unit having at least one module for capturing and storing information that includes multiple security cameras connected to an Internet modem, a router, a video recorder associated with a power source; the second is a unit for data processing and communication with the public having at least one interactive management module that includes a wireless card, a microprocessor, a display, a camera associated with a power source; and the third is a remote operational base unit having an Internet modem with public static IP and IP telephony management server, both linked to at least one router for managing the virtual private network; and this is in turn connected to a set of personal computers, a primary computer and a secondary computer for supporting said primary computer, in which the primary computer observes the cameras close to the interactive communication module and the IP camera installed in said module manages the communications of the corresponding communication module, and can open or close the video-audio as required.

2 Claims, 8 Drawing Sheets

(58) Field of Classification Search
USPC .......................................................... 348/159
See application file for complete search history.

(56) References Cited

U.S. PATENT DOCUMENTS

| | | | | |
|---|---|---|---|---|
| 2008/0022322 | A1* | 1/2008 | Grannan | H04N 5/44591 |
| | | | | 725/78 |
| 2008/0100705 | A1* | 5/2008 | Kister | G08B 13/19645 |
| | | | | 348/143 |
| 2011/0007159 | A1* | 1/2011 | Camp | H04N 7/183 |
| | | | | 348/143 |
| 2012/0072733 | A1* | 3/2012 | Bennett | H04L 9/3234 |
| | | | | 713/180 |
| 2012/0155483 | A1* | 6/2012 | Pugliese, IV | H04L 12/10 |
| | | | | 370/401 |
| 2012/0306994 | A1* | 12/2012 | Schwartz | G06F 19/3418 |
| | | | | 348/14.08 |

* cited by examiner

SYSTEM FOR CONTINUOUSLY MONITORING MOVEMENTS IN GENERAL

The present invention relates to a "SYSTEM FOR CONTINUOUSLY MONITORING MOVEMENTS IN GENERAL", preferably for use in surveillance, control and security in general, such as in: buildings, public institutions, banks, companies, factories, schools, hospitals, premises, clubs and the like.

PRIOR ART AND PURPOSE OF THE INVENTION

First of all, a great number of embodiments of integrated surveillance and monitoring services are currently known in the art, for example: cameras, displays, various detectors, and communication via various mechanisms and embodiments. The inventor himself also knows that the art encompasses different systems published in patent documents that deserve to be mentioned due to their importance, among which we cite:

U.S. Pat. No. 8,073,931 B2 refers to an integrated security system with broadband and mobile access, and a monitoring system with security systems and conventional devices to provide a threefold security network, with remote connectivity and access. The integrated security system includes a touch screen that provides the functional security of the touch keyboard, as well as content management and presentation, and it is used as a security system interface and an interface to interact with the network. The integrated security systems provides remote monitoring and operation control for conventional surveillance protection and complements existing security systems. The integrated security system is integrated into the network and wirelessly pairs with the conventional security dashboard, which allows broadband access to the OPL security systems.

Automation devices can be added, allowing users to remotely view live video or images and home control systems through a personal web portal, mobile phone or other client device. Users can receive notifications about detected events via e-mail.

U.S. patent 2003/0163709 A1 refers to a security system for buildings that allows clients from different companies located in the same office building to set their own appointments, and allows the employees of these companies to manage and analyze the programming of these appointments. It also provides the security personnel a way to analyze and control the number of visitors in the building during any given period of time. Visitors set their appointments by accessing a part of the system's programming and provide necessary information and the desired time and date for their appointment. The information is stored in the employees' segmented database. All of the information for a regular day is gathered from employees' database segments and combined, and then they are analyzed by the security personnel. A security guard integrates the information about the number of visitors that are expected on a particular day, the number of visitors that are already in the building, and the number of visitors that have already visited the building on the chosen date. Detailed information about the visitors is also available. By clicking on an assigned button, a guard can register a visitor entry or exit from the building, given the visitors' information is already stored in the system. The security guard can also print the visitors that pass, with a single click of the mouse, when an authorized visitor enters the building. A staff member with authorized special access (e.g. a security manager) can request and receive a statistical report on the building's visiting activity, organized by date, location, visitors and so forth.

It is also known that several organizations or institutions have at least one physical guard that is completely vulnerable to criminal activities. Therefore, said problem led to the thought that the solution is related to providing a "System for continuously monitoring movements in general" which, when at least one abnormal situation or event is detected, instantaneously interacts with a remote operator by displaying an image on an LCD display and playing a sound in real time, thereby replacing physical guards, in order to serve the user(s)'s needs directly or indirectly.

The remote operator observes the required area and takes the security measures that are deemed necessary at that time. Said remote operator controls the entries, exits and other movements within the building or other institution by means of optical capture devices (high-definition and infrared cameras).

Neighbors or auxiliary personnel can also observe the activities on the premises in real time by simply using a computer with Internet access from anywhere worldwide, just as people of legal age can access by means of their television set, since it connects directly though cable.

The way in which these and other objectives and advantages of the invention are achieved in practice will be shown more clearly by referencing the following detailed description of preferred embodiments of the invention and the annexed figures, by way of example and including but not limited to it, in which.

PRIOR ART AND PURPOSE OF THE INVENTION

Figure 1:
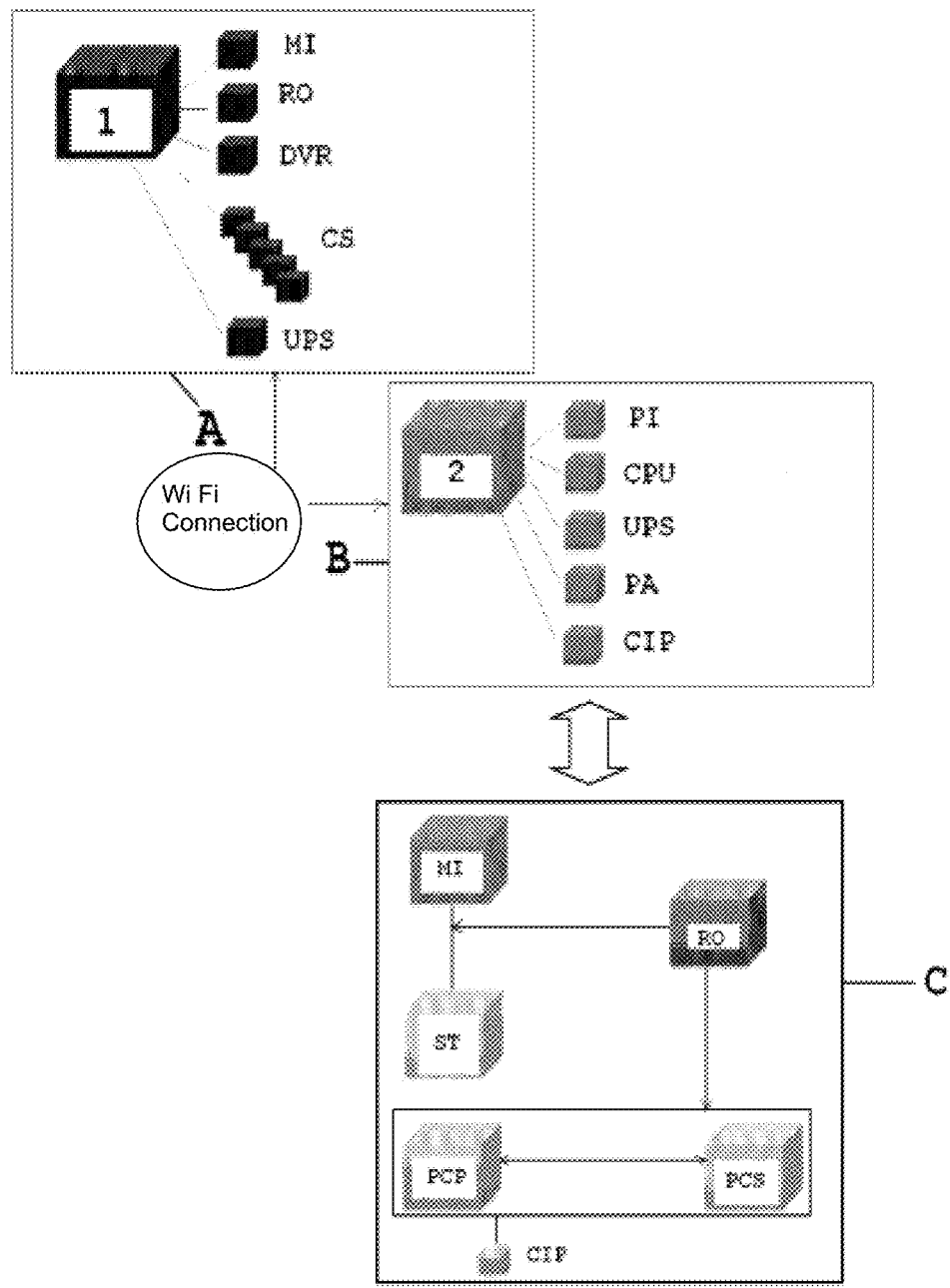
FIG. 1 shows a diagrammatic view of the entire monitoring system of the invention.
Figure 2:
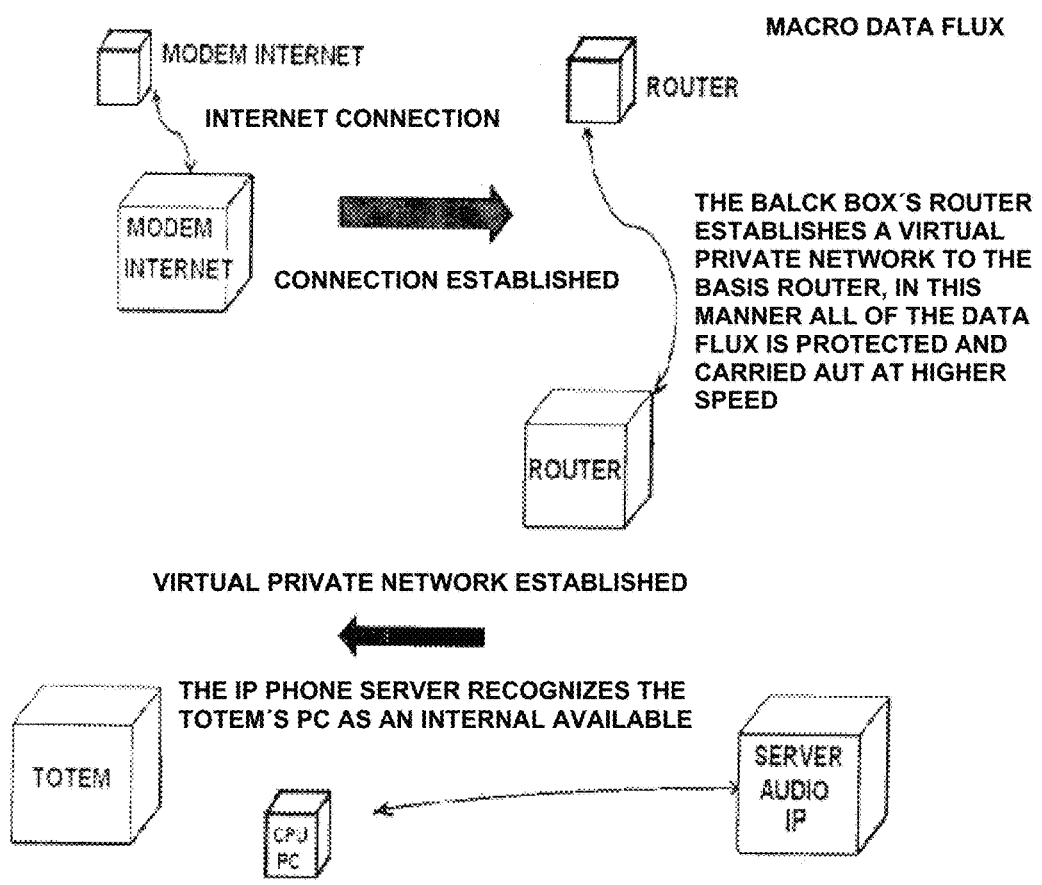
FIGS. 2, 3, 4 and 5 show the flow of data that are involved in the various interactive elements of the monitoring system.
Figure 3:
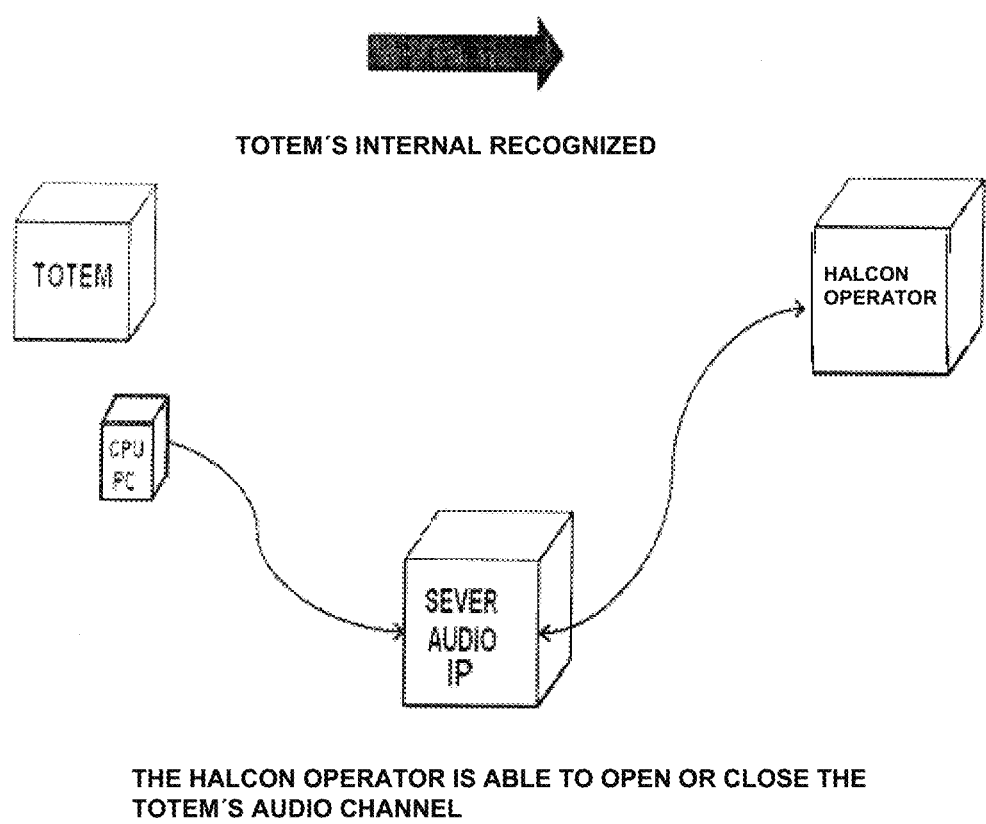
Figure 4:
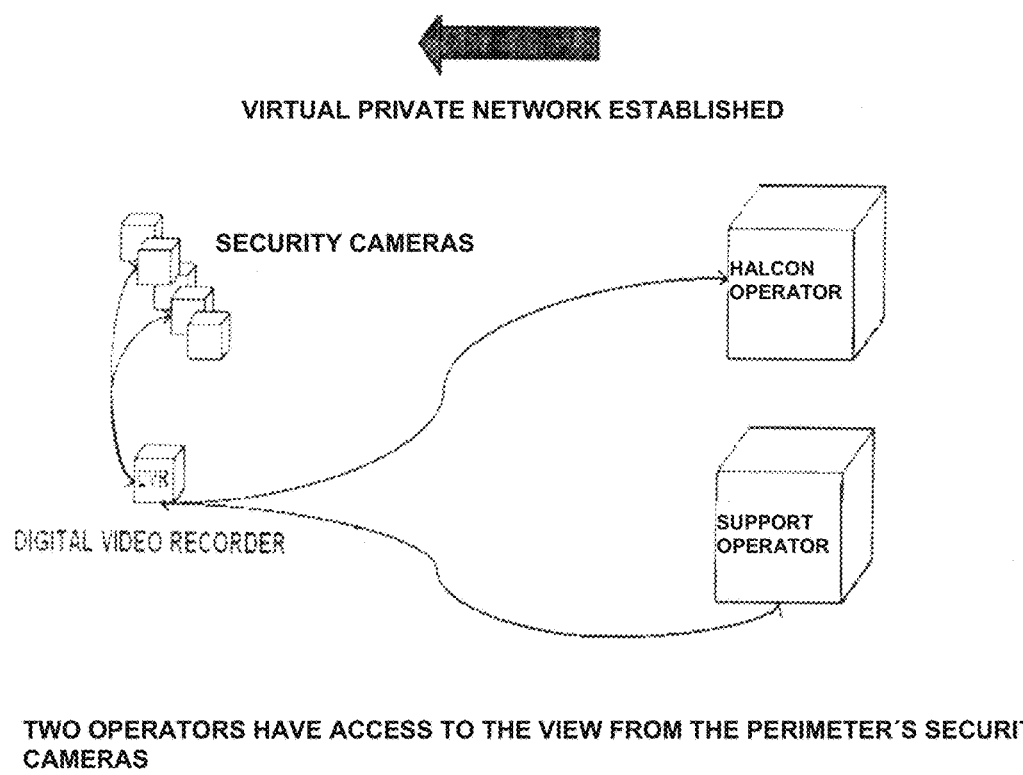
Figure 5:
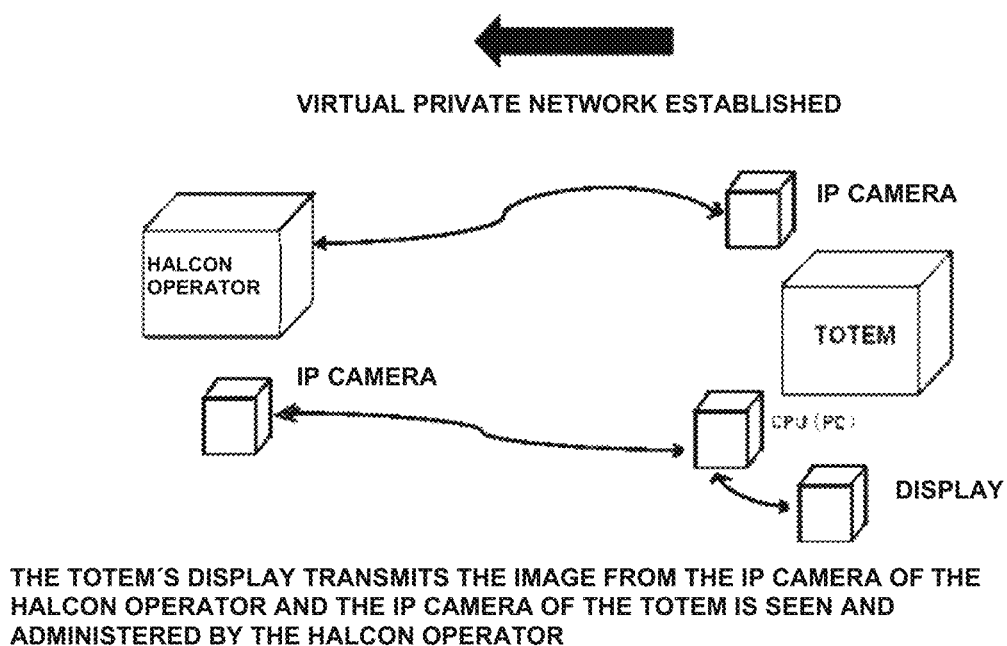
Figure 6:
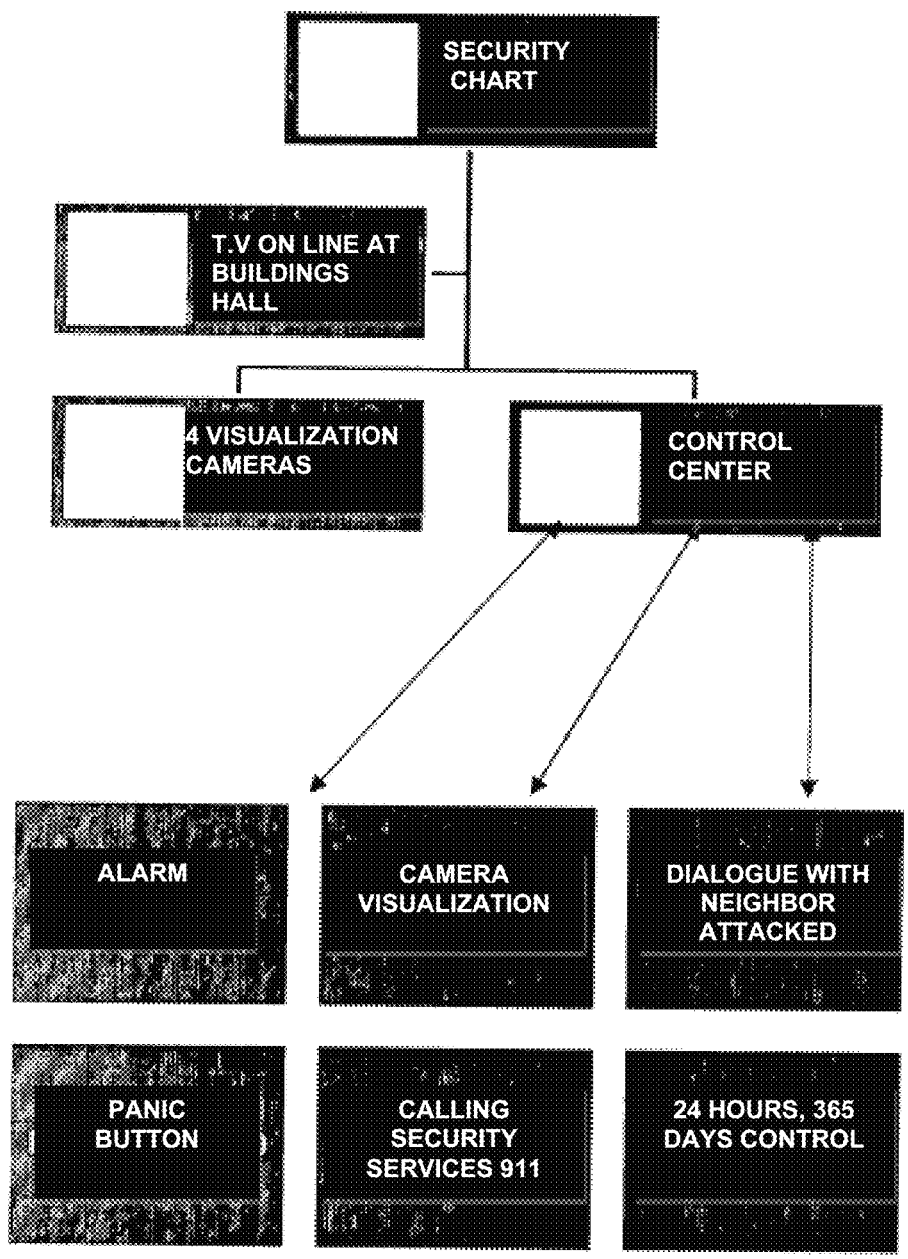
FIG. 6 shows a basic block diagram applied to the monitoring of a building.
Figure 7:
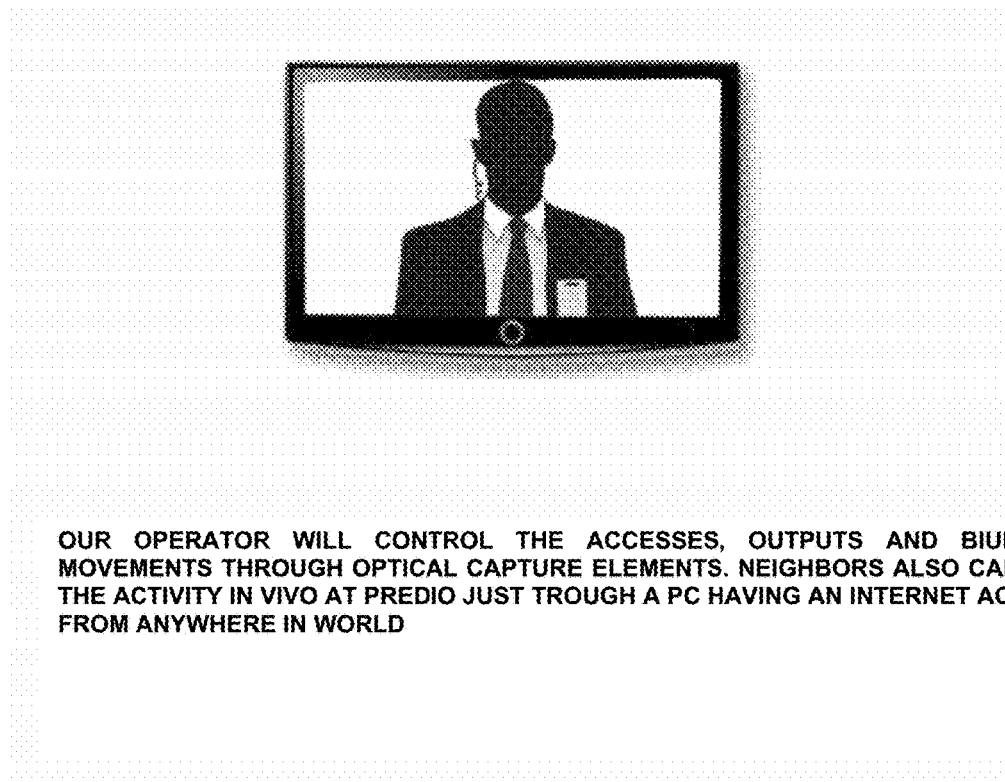
FIGS. 7 and 8 show diagrams that illustrate a building's remote operator.
Figure 8:
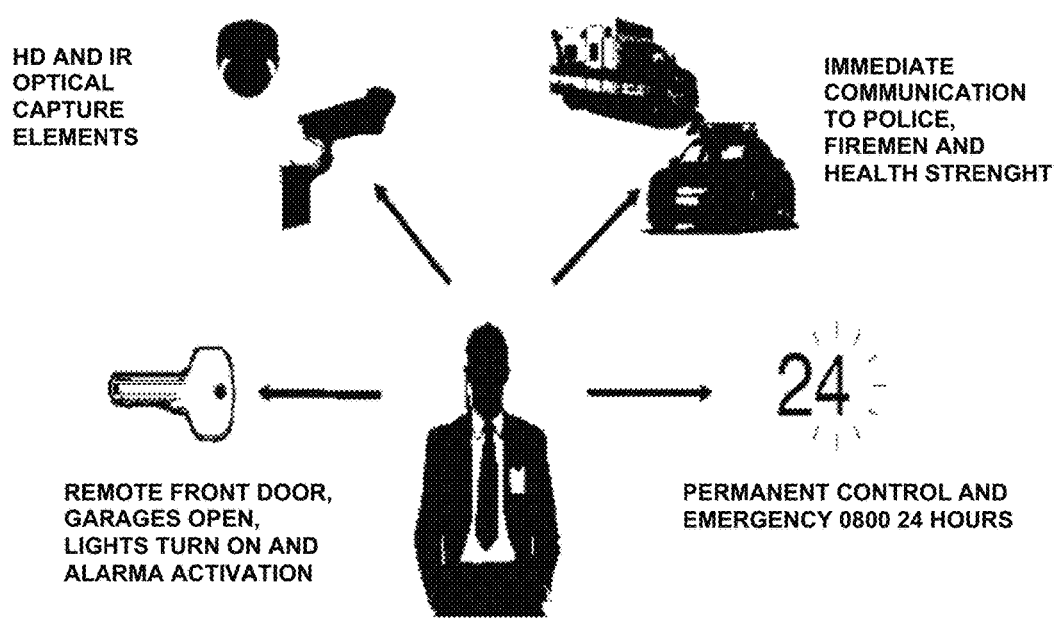

In all of the figures, the same reference numbers indicate equal or corresponding elements, and are:

In FIG. 1, the elements involved are:
A: Permanent monitoring unit.
1: Information capture and storage unit.
MI: Internet modem with public static IP.
RO: Router emits Wi-Fi waves and manages the virtual private network (VPN).
DVR: Digital video recorder controls the cameras and records locally 24 hours.
SC: Security cameras.
UPS: A source of power supply;
B: Unit for data processing and communication with the public.
2: Interactive management module (TOTEM/S).
PI: Wireless card, receives Wi-Fi waves to connect the Totem.
CPU: (PC) Microprocessor, manages the Totem's video and audio.
UPS: Source of power supply;
PA: Display, to observe the IP camera installed in the remote operator's PC.
CIP: Camera, used to observe the public near the Totem.
C: Remote operational base unit.
MI: Internet modem with public static IP.
RO: Router controls the virtual private network (VPN).

ST PI telephony server, manages IP telephony, each Totem is a self-service extension. When the operator detects public near the equipment, it activates audio by means of an internal call.

PCP: Primary personal computer, with two 32" displays, the primary operator (Halcon) observes the cameras near the Totem and the IP camera installed in the Totem can manage the Totem's communications; it can open or close the audio as needed.

PCS: Secondary personal computer, with two 32" displays, the secondary operator (Apoyo) observes all of the cameras installed at the premises being monitored, acting as support for the primary operator.

CIP: IP Camera, allows the public to see the operator in the Totem.

Each Totem has an internal IP address.

Communications management is carried out by means of a virtual private network (VPN), which ensures the integrity of transmitted data and the speed of the connections between each station and the operating base.

The cameras are installed at different locations in the premises being monitored. They are wired to the management module, which is installed within a sector with restricted access.

The Totem is connected to the management module via Wi-Fi.

The Totem CPU is connected to the IP camera of the interactive station and displays this camera's image on the Totem display.

The advantages of this system are:
100% increase in system effectiveness.
100% decrease in labor lawsuits.
100% decrease in wrongful death actions
Up to 50% cost decrease.
Cameras record 24 hours a day.
Information capture and storage module.

Operating Principle

A system for continuously monitoring movements in general is shown, preferably for security by image monitoring, which interacts with the monitoring operator by means of images and sounds in real time.

The permanent monitoring A Unit receives data from the premises to be monitored and guarded (observing and interacting using voice and video, recording, storing information and data). The A Unit operates by means of a set of cameras placed in strategic places, a digital video recorder (DVR) transmits the information obtained by the remote cameras by means of an advanced IP communication system that allows it to emit and receive information from the cameras, which records 24 hours daily and stores the information for 10 days, interacting with the system's networks. This process (using IP) exchanges packets of information, e.g. between two networks, using a router (RO) that manages the virtual private network. Transmits and receives the information through Wi-Fi communication. The whole process is linked by an Internet modem (MI). The A Unit is protected from electric power outages and/or interruptions by a UPS (uninterruptible power supply). This prevents loss of information due to power outages caused by service providers as well as by premeditated attacks that involve cutting power.

The B Unit, which processes data and communicates with the public, unlike the other services offered by various security companies, places an interactive management module in the hall, built into an iron frame with legs and a base secured to the floor, which holds the flat display, the computer's motherboard, the video, sound and memory card, the hard drive, the administrative hard drive, the power conversion source, the battery, the speaker and the microphone. The B Unit is armored and is vandalism-proof. Users can communicate and interact with the remote operator simply by looking at the display and interacting in real time. Users can also call the operating base and speak with the operator, who can select the camera that the user requests and get information from what can be seen and by virtue of the fact that the remote operator is physically located in an armored location outside the building so that nothing can disrupt his/her function and immediately alert the security team when an unauthorized entry or suspicious movement is detected.

Both the camera and the aforementioned display operate through IP technology. It is linked to the A Unit via Wi-Fi by means of an Internet modem. The computer has the primary role of managing video and audio of the B Unit. Just like the A Unit, the B Unit is protected from electric power outages and/or interruptions by a UPS (uninterruptible power supply). This prevents loss of information due to power outages caused by service providers as well as by premeditated attacks that involve cutting power.

The C Unit, the remote operational base, possesses 2 displays in which the cameras installed at the objective to be monitored can be viewed. It is comprised of an Internet modem with IP, an IP telephony server linked to the B Unit. When the operator detects public near the B Unit, it activates the audio by means of an internal call. Using the television display (LCD) in the B Unit, the operator observes the signal emitted by the IP camera located therein. A support operator with 2 displays observes all of the installed cameras on his/her computer. He/she can also communicate through the B Unit; it can open or close the audio as required by the cameras linked to the B Unit via a Wi-Fi wireless electronic device connection with an Internet modem.

Just like the A and B Units, the C Unit is protected from electric power outages and/or interruptions by a UPS (uninterruptible power supply). This prevents loss of information due to power outages caused by service providers as well as by premeditated attacks that involve cutting power.

This station serves as support for the interaction station (B Unit). The operator observes the monitoring camera installed near said B Unit, placing at the objective the top camera located in said unit.

In one of the displays, the operator has the IP telephony control panel, which can receive and respond to audio from each objective. All of the operation points, objectives and monitoring stations are configured as nodes within the network.

In summary, the operator(s) visualize(s) the premises to be monitored by means of an Internet VPN. Over this network, images are transmitted by the IP DVR, which records locally at each location.

At the objectives, different cameras are installed and converge at the DVR, which sends the images to the base. An IP camera is placed on the Totem, which is used by the interaction operator to observe the public that interacts with the operator.

On the Totem display, the public sees the operator that manages the monitoring and can address any queries or comments to the operator. In real time, this is achieved via IP telephony, each Totem is an IP extension, in which the operator opens and closes the audio channel, without any action by the public aside from simply speaking in front of the display.

The operator possesses various functionalities, such as sounding an alarm, turning lights on and off, and engaging locks.

The invention claimed is:

1. A system for interaction and continuously monitoring of movements applied to guarding, monitoring and security services in a monitored zone, comprising:
   a first unit having a permanent monitoring unit located in the monitored zone, said first unit having:
   IP cameras connected to an internet modem;
   at least one module for capturing and storing information from the IP cameras;
   a WiFi router for managing a virtual private network (VPN);
   a digital video recorder; and
   an electric power source (UPS);
   a second unit having a unit for data processing and communication with the public located in the monitored zone, said second unit having:
   a wireless card which establishes a virtual private network (VPN) that creates a direct connection with the WiFi router of the first unit;
   a microprocessor which manages the information of video and audio data of the second unit;
   a display;
   IP cameras used to observe the public located in an area where the second unit is located;
   an IP audio device; and
   an electric power source (UPS);
   a third unit having a remote operational base unit, said third unit having:
   an Internet modem with public static IP;
   an IP telephony management server;
   one router for managing the virtual private network (VPN) that is linked to the router of the first unit, said router of the third unit is connected to the Internet modem and the IP telephony management server; and
   a plurality of personal computers; comprised by a primary computer and at least a secondary computer for supporting said primary computer; and
   an IP camera which allows the public to see the operator in the second unit;
      wherein the connection between the wireless card of the second unit and the WiFi router of the first unit is made through an internet protocol (IP);
      wherein the display of the second unit shows the video from the IP camera of the third unit;
      wherein the IP audio device of the second unit establishes an audio connection between the public of the monitored zone and a third unit operator;
      wherein the plurality of personal computers is authorized to observe and monitor the activity in the monitored zone;
      wherein the IP cameras used to observe the public located in the area where the second unit is located permits the operator to see the public located in the monitored zone.

2. The system of claim 1, characterized because the first and second units are linked by an internet protocol (IP) either via WiFi or cable.

* * * * *